United States Patent [19]

Brown et al.

[11] Patent Number: 5,533,752

[45] Date of Patent: Jul. 9, 1996

[54] APPARATUS FOR RESTRAINING MOVEMENT OF AN OCCUPANT OF A VEHICLE

[75] Inventors: Louis R. Brown, Oxford; Charles F. Steffens, Jr., Washington, both of Mich.

[73] Assignee: TRW Vehicle Safety Systems Inc., Lyndhurst, Ohio

[21] Appl. No.: 336,380

[22] Filed: Nov. 8, 1994

[51] Int. Cl.⁶ .................................................. B60R 21/30
[52] U.S. Cl. ....................... 280/739; 280/730.2; 137/67
[58] Field of Search ................... 280/739, 730 A, 280/730 R, 728 R, 738; 220/203, 208, 209; 137/67, 852

[56] References Cited

U.S. PATENT DOCUMENTS

| | | | |
|---|---|---|---|
| 3,370,886 | 2/1968 | Frost | 280/739 |
| 3,626,980 | 12/1971 | Svensson | 137/852 |
| 3,861,712 | 1/1975 | Matsui et al. | 280/739 |
| 3,884,499 | 5/1975 | Oka et al. | 280/739 |
| 4,215,724 | 8/1980 | Logsdon | 137/852 |
| 4,902,036 | 2/1990 | Zander et al. | 280/736 |
| 5,197,759 | 3/1993 | Kroiss et al. | 280/739 |
| 5,316,336 | 5/1994 | Taguchi et al. | 280/730 A |

FOREIGN PATENT DOCUMENTS

| | | | |
|---|---|---|---|
| 0896312 | 11/1953 | Germany | 280/728 R |
| 4113428 | 10/1992 | Germany | 220/208 |
| 5016751 | 1/1993 | Japan | 280/730 a |

*Primary Examiner*—Paul N. Dickson
*Attorney, Agent, or Firm*—Tarolli, Sundheim, Covell, Tummino & Szabo

[57] ABSTRACT

An apparatus (10) for restraining movement of an occupant of a vehicle includes an inflatable air bag (16). When the air bag (16) is inflated to a predetermined pressure, a vent valve assembly (26) opens and vents fluid from the air bag. The vent valve assembly (26) connects the air bag (16) with a support structure. In one embodiment, the vent valve assembly connects the air bag with a door (14) of a vehicle. The vent valve assembly includes a base (46) which extends through an opening (34) in the air bag (16) and through an opening (36) in an inner panel (32) of the vehicle door (14). The base (46) clamps the air bag against the inner panel (32) of the vehicle door (14). The vent valve assembly (26) includes a metal valve element (50) which is plastically deformed by fluid pressure in the air bag (16) to enable fluid to flow from the air bag.

21 Claims, 4 Drawing Sheets

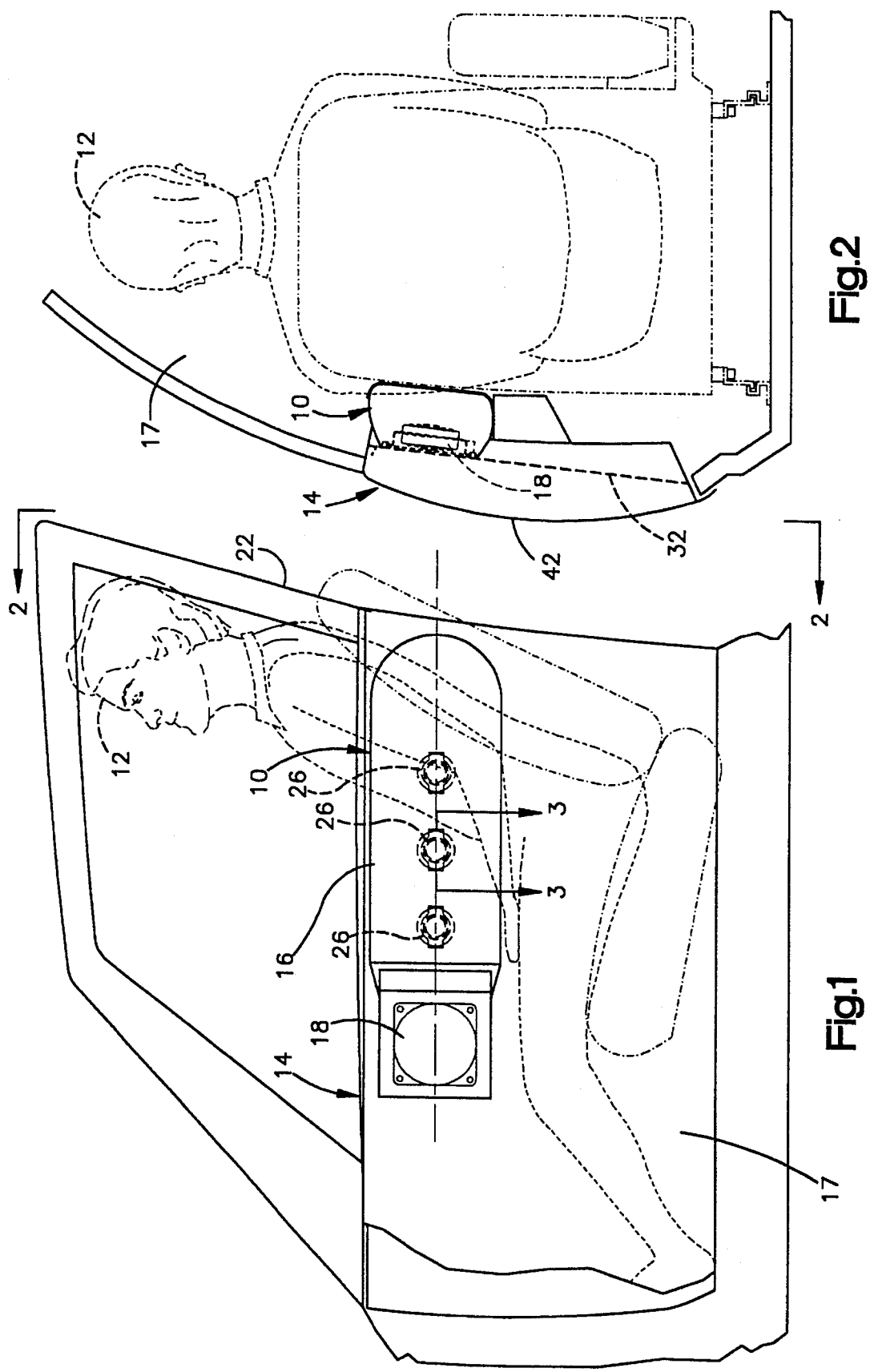

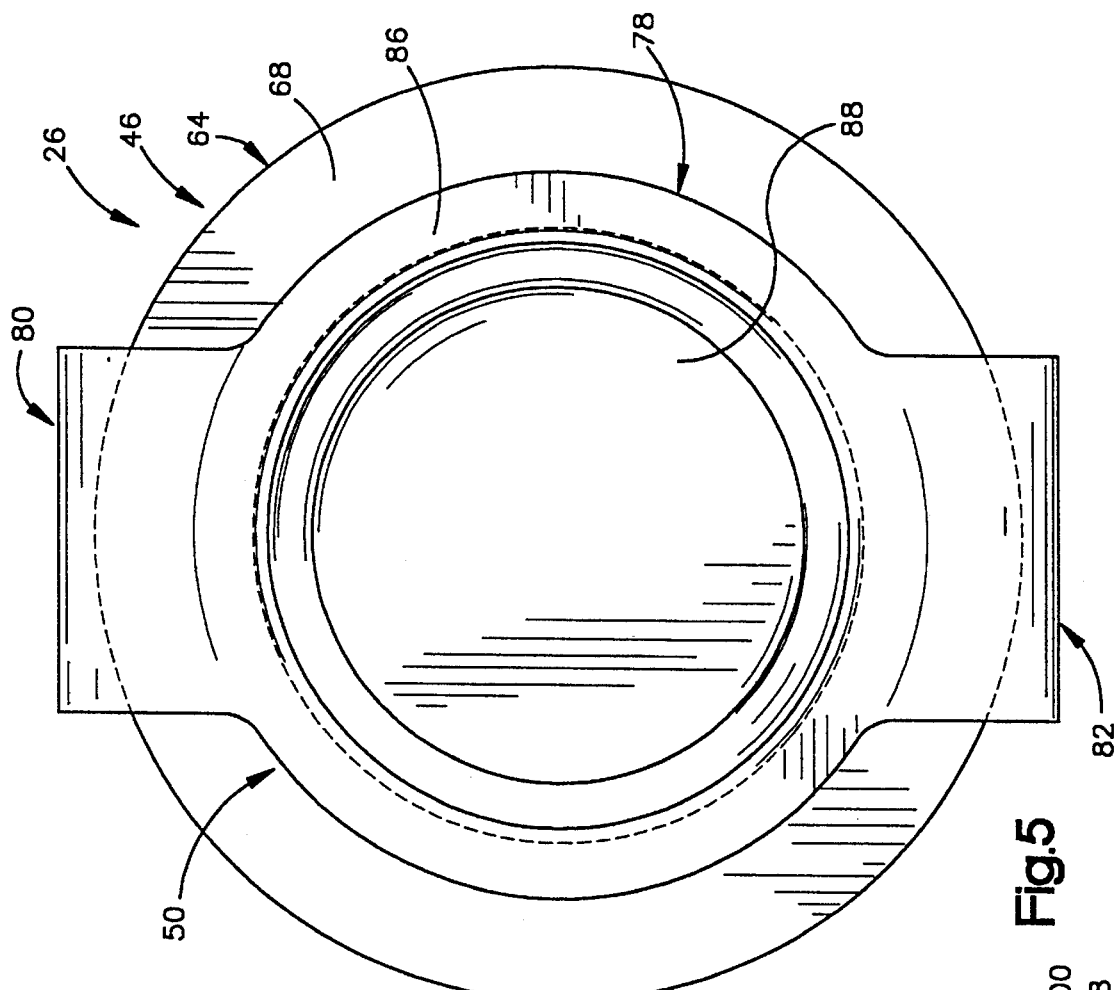
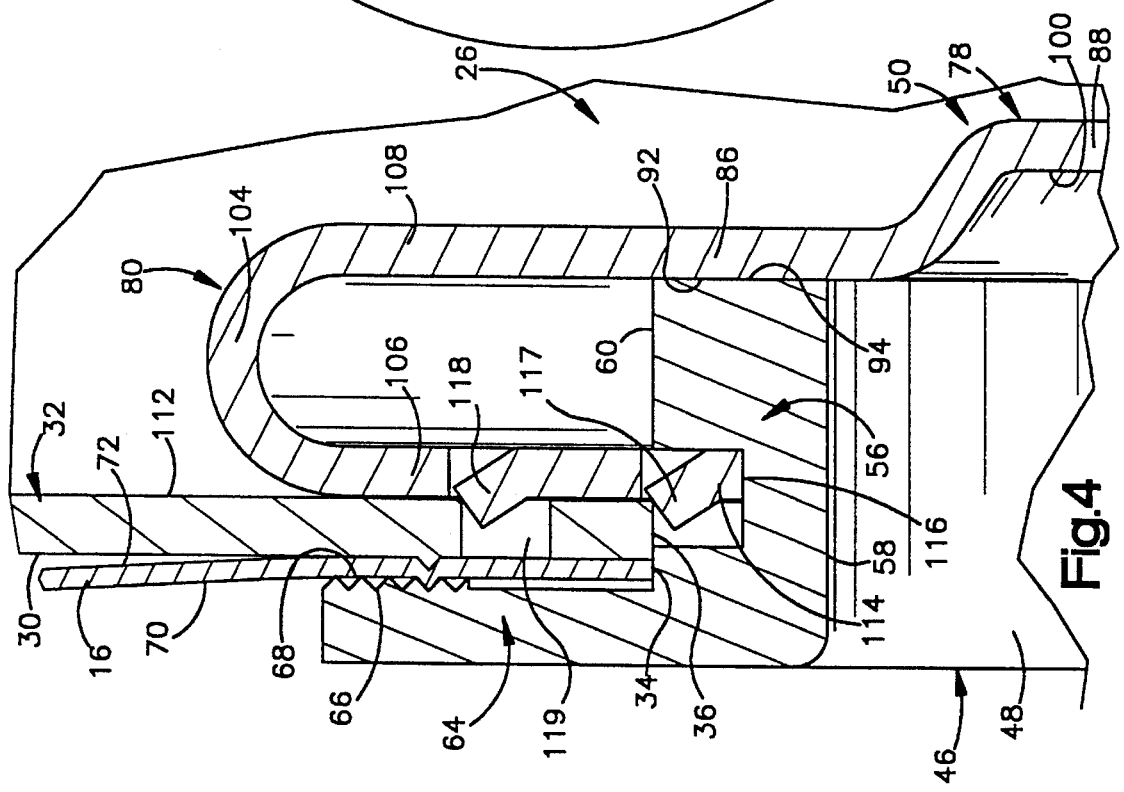

APPARATUS FOR RESTRAINING MOVEMENT OF AN OCCUPANT OF A VEHICLE

BACKGROUND OF THE INVENTION

The present invention relates to an inflatable vehicle occupant restraint system, such as an air bag system, for restraining movement of an occupant of a vehicle during a collision and, more particularly, relates to a vent valve for venting inflation fluid from an air bag.

An inflatable vehicle occupant restraint system, such as an air bag system, often includes a vent for venting inflation fluid from the air bag. The vent allows for early bag pressurization, yet minimizes the possibility of the pressure in the air bag becoming excessive.

SUMMARY OF THE INVENTION

In accordance with the present invention, a vent valve assembly is provided to vent fluid from an air bag during inflation of the air bag. The air bag is connected to a support structure by the vent valve assembly. In one embodiment, the vent valve assembly connects the air bag with a door of a vehicle.

The vent valve assembly includes a base having an opening through which fluid is conducted from the air bag. A valve element cooperates with the base to block fluid flow through the base during initial inflation of the air bag. When the fluid pressure in the air bag reaches a predetermined fluid pressure, a fluid pressure force applied against the valve element plastically deforms portions of the valve element to actuate the vent valve assembly to an open condition. Fluid is then conducted from the air bag through the open vent valve assembly.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 1 is a schematic illustration of an apparatus embodying the present invention;

FIG. 2 is a rear elevational view, taken generally along the line 2—2 of FIG. 1;

FIG. 4 is an enlarged illustration of a portion of FIG. 3;

FIG. 5 is a view taken generally along the line 5—5 of FIG. 3; and

DESCRIPTION OF ONE SPECIFIC PREFERRED EMBODIMENT OF THE INVENTION

Figure 3:
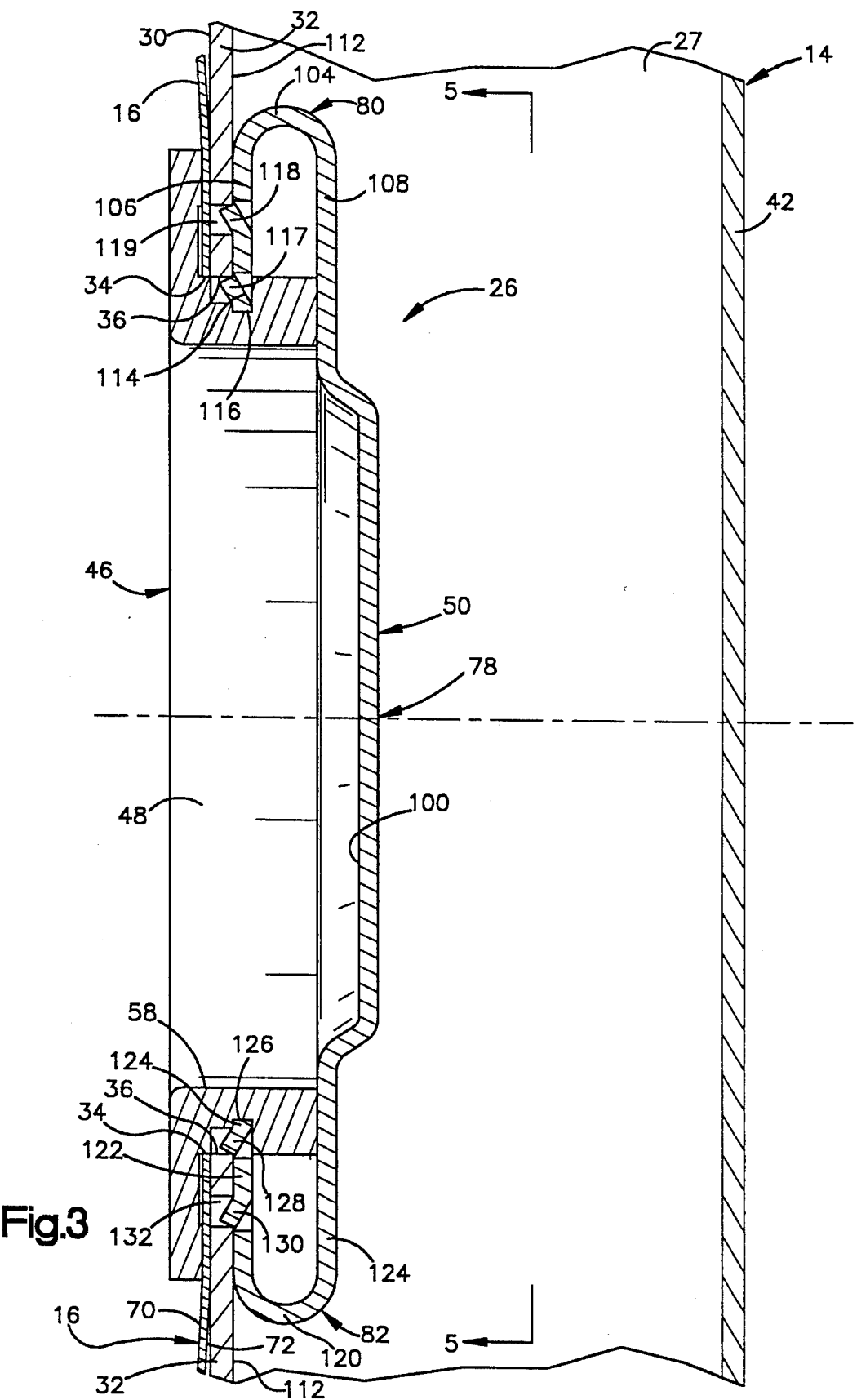
FIG. 3 is a sectional view, taken generally along the line 3—3 of FIG. 1.

An apparatus 10 (FIGS. 1 and 2) for restraining movement of an occupant 12 of a vehicle during a collision is mounted on a door 14 of the vehicle. The apparatus 10 includes an air bag 16 (FIG. 1). An inflator assembly 18 is connected in fluid communication with the air bag 16 and is operable to provide inflation fluid to inflate the air bag in a passenger compartment 17 of the vehicle. The inflator assembly 18 is mounted on an inner panel 32 of the door 14. The inflator assembly 18 may be of any suitable construction, and may be constructed as the inflator assembly disclosed in U.S. Pat. No. 4,902,036.

The air bag 16 is mounted on an inner side surface 30 of the inner panel 32 (FIG. 3) of the door 14. Prior to inflation, the air bag 16 is stored in the vehicle door 14. When the air bag 16 is to be inflated, fluid flows from the inflator assembly 18 into the air bag and inflates the air bag into a position to restrain movement of the occupant 12.

A plurality of vent valve assemblies 26 (FIG. 1) are associated with the air bag 16 and are operable from a closed condition to an open condition to vent fluid from the air bag 16. Three vent valve assemblies 26 are shown in FIG. 1. There may be more or less vent valve assemblies. The vent valve assemblies 26 are operable to vent fluid from the air bag 16 in the passenger compartment 17 into a cavity 27 in door 14. By venting fluid from the air bag 16, over-pressurization of the air bag is avoided and peak pressure in the air bag is controlled.

Since the vent valve assemblies 26 are similar in construction, only one vent valve assembly 26, shown in FIGS. 3–6, will be described in detail. The vent valve assembly 26 extends through a circular opening 34 (FIGS. 3 and 4) in the air bag 16. The vent valve assembly 26 also extends through a circular opening 36 in the inner panel 32 of the door 14.

The vent valve assembly 26 (FIG. 3) includes a rigid one-piece metal base 46 which extends through the circular opening 34 in the air bag 16 and through the circular opening 36 in the inner panel 32 of the door 14. The openings 34 and 36 could be other than circular. They could be oblong or rectangular, for example. The base 46 has a circular central vent opening 48 which extends axially through the base between the interior of the air bag 16 in the passenger compartment 17 and the cavity 27 in the door 14. A one-piece metal vent valve element 50 is disposed in the cavity 27 in the door 14 and blocks fluid flow from the air bag 16 through the opening 48.

The base 46 includes a cylindrical main section 56 which extends through the openings 34 and 36 in the air bag 16 and inner panel 32 of the door 14, respectively. The main section 56 of the base 46 extends from the interior of the air bag 16 in the passenger compartment 17 into the cavity 27 in the door 14. The main section 56 of the base 46 has a cylindrical inner side surface 58 which defines the opening 48. The main section 56 of the base 46 has a cylindrical outer side surface 60 which is engaged by the portion of the air bag 16 which defines the circular opening 34 in the air bag 16 and the portion of the inner panel 32 which defines the circular opening 36 in the inner panel 32 of the door 14.

The base 46 has a radially extending annular rim 64, which is formed as one piece with the main section 56 of the base 46. The rim 64 is disposed in the passenger compartment 17 in a coaxial relationship with the cylindrical main section 56 of the base 46. The rim 64 has an annular clamp section 66 (FIG. 4). The clamp section 66 has a notched or irregular clamp surface 68 which engages an inner side surface 70 of the air bag 16. The clamp section 66 presses an outer side surface 72 of the air bag against the inner side surface 30 of the inner panel 32 of the door 14. The clamp section 66 applies sufficient force against an annular area on the inner side surface 70 of the air bag 16 to clamp the air bag 16 securely between the rim 64 of the base 46 and the inner door panel 32. The air bag vent opening 34 may be locally reinforced with layers of material or by any known means.

The valve element 50 comprises a single piece of sheet metal. The valve element 50 includes a circular main section 78 (FIG. 5) and a pair of support sections 80 and 82. The circular main section 78 includes an annular rim 86 which is formed as one piece with a central portion 88 of the valve element 50. The annular rim 86 on the main section 78 of the valve element 50 has a flat annular inner side surface 92 (FIG. 4). The inner side surface 92 of the rim 86 is pressed against a flat annular end surface 94 of the main section 56 of the base 46 by the support sections 80 and 82. Therefore, the vent valve element 50 essentially blocks fluid flow through the opening 48 into the cavity 27 in the door 14 when the vent valve element is in the closed condition of FIGS. 3 and 4.

The support section 80 of the vent valve element 50 has a generally U-shaped configuration. Thus, the support section 80 has an inner leg section 106 and a parallel outer leg section 108 (FIG. 4) connected together by an arcuate bend section 104. The outer leg section 108 is joined to the annular rim 86 on the main section 78 of the valve element 50. When the valve element 50 is in the closed condition of FIG. 4, the inner leg section 106 abuts an outer side surface 112 of the inner panel 32 of the door 14. A distal end portion 114 of the inner leg section 106 extends into a recess 116 formed in the main section 56 of the base 46.

A tab 117 formed in the inner leg section 106 engages the panel 32 of the door 14 at the opening 36 to retain the end portion 114 of the inner leg section in the recess 116. A second tab 118 is formed in the inner leg section 106. The tab 118 engages a rectangular opening 119 to further retain the end portion 114 of the inner leg section 106 in the recess 116.

The support section 82 (FIG. 3) has the same generally U-shaped configuration as the support section 80. Thus, the support section 82 has a pair of parallel leg sections 122 and 124 connected together by an arcuate bend section 120. The outer leg section 124 is joined to the annular rim 86 on the main section of the valve 50 diametrically opposite the leg section 108 of the support section 80. When the valve element is in the closed condition of FIG. 3, the leg section 122 abuts the outer side surface 112 of the inner panel 32 of the door 14. The leg section 122 has a distal end portion 124 which extends into a recess 126 formed in the main section 56 of the base 46 at a location diametrically opposite from the recess 116 in the main section 56 of the base 46.

A tab 128 (FIG. 3) formed in the inner leg section 122 engages the panel 32 of the door 14 to retain the end portion 124 of the inner leg section in the recess 126. A second tab 130 is formed in the inner leg section 122. The tab 130 engages a rectangular opening 132 to further retain the end portion 124 of the inner leg section 122 in the recess 126.

The assembly of the parts is relatively simple. The base 46 is inserted into the air bag 16 through the opening (not shown) where fluid from the inflator assembly 18 enters the air bag. The main section 56 of the base 46 is then positioned in the opening 36 of the inner panel 32 of the door 14 with the air bag outer side surface 72 in contact with the inner side surface 30 of the inner door panel 32. The inner leg sections 106 and 122 of the support sections 80 and 82 of the valve element 50 are resiliently deflected away from each other (FIG. 5), and the valve element is moved toward the base 46 until the leg sections 106 and 122 snap into the recesses 116 and 126, respectively. The valve element 50 is constructed so that it is sufficiently stiff so that the surface 92 will not be distorted while legs 80 and 82 are flexed and thus surface 92 will be flat when it engages surfaces 94.

Engagement of the leg sections 106 and 122 of the support sections 80 and 82 in the recesses 116 and 126 in the main section 56 of the base 46 and abutment of the leg sections 106 and 122 against the outer side surface 112 of the inner door panel 32 retains the base against axial movement relative to the door 14. Abutment of the leg sections 106 and 122 of the support sections 80 and 82 of the vent valve element 50 against the inner door panel 32 also results in the rim 64 being pressed firmly against the inner side surface 70 of the air bag 16. The leg sections 108 and 124 of the support sections 80 and 82 function to press the inner surface 92 of the vent valve element 50 against the base 46 when the vent valve element is in the condition shown in FIG. 3.

When the vent valve assembly 26 is in the condition shown in FIG. 3, the main section 78 of the vent valve element 50 blocks the flow of fluid from the air bag 16 into cavity 27 formed between the inner panel 32 and an outer panel 42 of the door 14.

Figure 6:
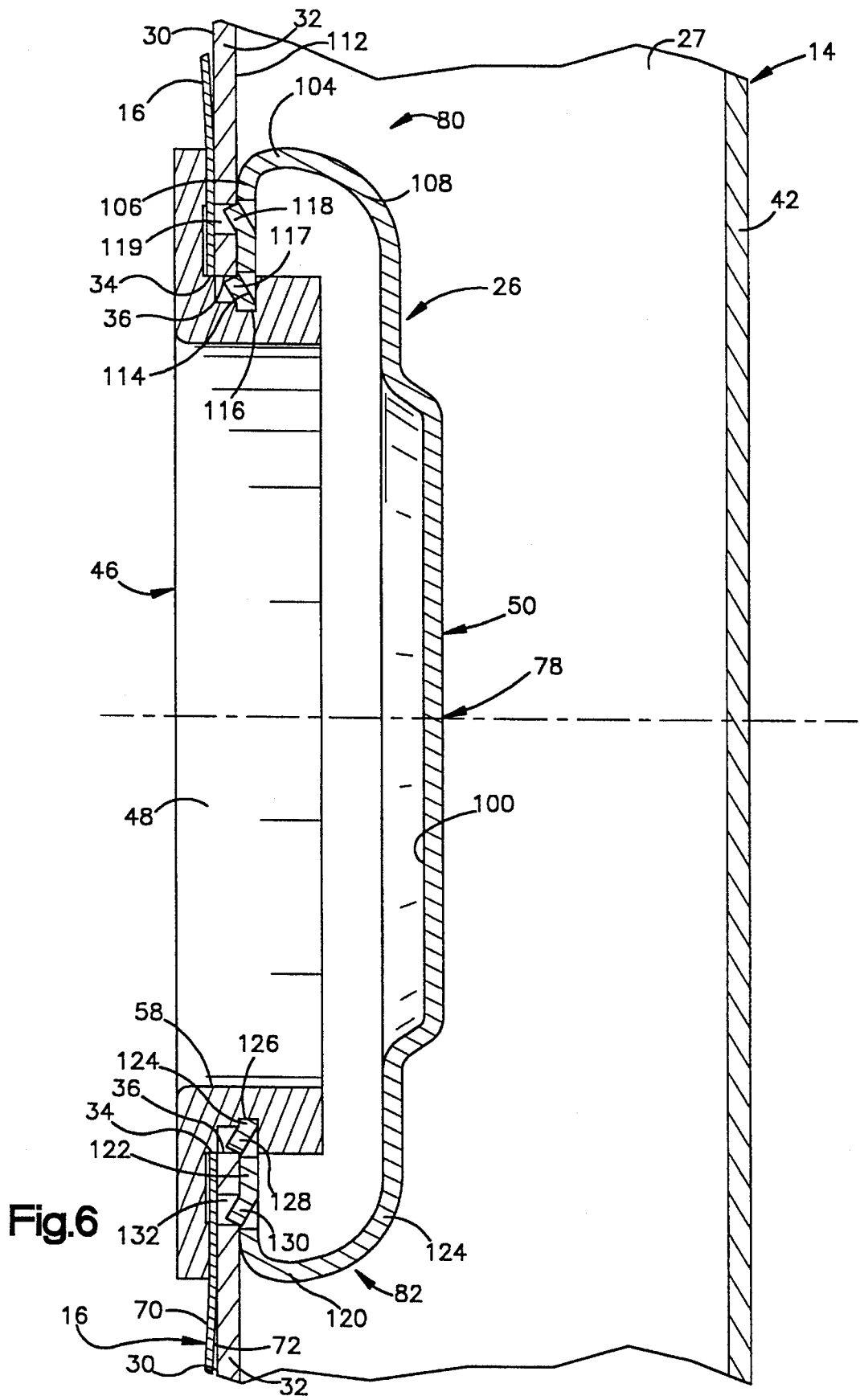
FIG. 6 illustrates the structure of FIG. 3 with parts in different positions.

The main section 78 of the vent valve element 50 is moved from the closed condition of FIG. 3 to the open condition of FIG. 6 by plastic deformation of the support sections 80 and 82 of the vent valve element. Specifically, when the fluid pressure in the air bag 16 reaches a predetermined pressure, for example, 15 psig, the fluid pressure force applied against an inner side surface 100 of the main section 78 of the vent valve element 50 moves the main section of the vent valve element axially outward away from the base 46 to an open condition as shown in FIG. 6 and plastically deforms support sections 80 and 82. When the vent valve element 50 is in the open condition of FIG. 6, the inner side surface 92 of the rim 86 is spaced from the end surface 94 of the main section 56 of the base 46 to define an opening 52 between the vent valve element 50 and the base 46 and thereby enable fluid to flow from the air bag 16 through the opening 52. When the vent valve element 50 is in the open condition of FIG. 6, fluid can flow from the air bag 16 through the opening 48 and the opening 52 into the cavity 27 between the inner panel 32 and outer panel 42 of the door 14.

When the vent valve 50 is plastically deformed from the closed condition of FIG. 3 to the open condition of FIG. 6, the length of the leg sections 106 and 108 in the support section 80 and the length of the leg sections 122 and 124 in the support section 82 decreases. At the same time, the length of the bend section 104 in the support section 80 and the bend section 120 in the support section 82 increases. Although the inner leg sections 106 and 122 decrease in length as the vent valve 50 is plastically deformed to the open condition, the inner leg sections still engage the outer side surface 112 of the inner panel 32 of the door 14 to hold the base 46 in place.

The distance which the main section 78 of the vent valve element 50 is moved away from the base 46 varies as a direct function of the fluid pressure applied against the inner side surface 100 of the vent valve element. Therefore, the greater the fluid pressure in the air bag 16, the further the main section 78 of the vent valve element 50 is moved away from the base 46 and the larger is the opening through which fluid is exhausted from the air bag 16 into the cavity 27 in the door 14.

After the fluid pressure in the air bag 16 decreases, the plastically deformed vent valve element 50 remains in the open condition of FIG. 6. Thus, the support sections 80 and 82 of the valve element 50 remain deformed. The support sections 80 and 82 support the main section 78 of the valve element 50 in a spaced apart relationship with the base 46.

From the above, it should be clear that the air bag 16 is secured to the door 14 by the vent valve assembly 26 before, during and after inflation of the air bag. Moreover, although the vent valve assembly 26 is disclosed as being mounted on the door 14, it is contemplated that the air bag could be secured to many different types of support structures by the vent valve assembly. Also, while it is preferred to form the vent valve element 50 from a single piece of sheet metal, the vent valve element could be formed from other materials or multiple materials if desired.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in restraining movement of an occupant of a vehicle, said apparatus comprising:

an air bag inflatable from a deflated condition to an expanded condition extending adjacent to the occupant of the vehicle; and vent valve means connected in fluid communication with said air bag for venting fluid from said air bag, said vent valve means being operable between a closed condition and an open condition enabling fluid to flow from the air bag through said vent valve means;

said vent valve means including a valve element and a base having surface means for defining an opening through which fluid flows from said air bag when said vent valve means is in the open condition, said valve element having a first portion which blocks fluid flow through the opening in said base when said vent valve means is in the closed condition and a second portion which retains said first portion of said valve element in said first position relative to said base when said vent valve means is in the closed condition, said second portion of said valve element being plastically deformable from a first configuration to a second configuration upon movement of said first portion of said valve element under the influence of fluid pressure in said air bag from said first position to a second position relative to said base and operation of said vent valve means from the closed condition to the open condition, said second portion of said valve element remaining in the second configuration and supporting said first portion of said valve element in said second position relative to said base after fluid pressure in the air bag has been reduced to a fluid pressure which is insufficient to deform said second portion of said valve element plastically from the first configuration to the second configuration.

2. An apparatus as set forth in claim 1 wherein said first portion of said valve element is disposed in engagement with said base when said first portion of said valve element is in said first position, said first portion of said valve element being spaced from said base when said first portion of said valve element is in said second position.

3. An apparatus as set forth in claim 2 wherein said second portion of said valve element is connected with said base when said first portion of said valve element is in said first position and when said second portion of said valve element is in said second position.

4. An apparatus as set forth in claim 1 wherein said second portion of said valve element includes a first support section which extends in a first direction from said first portion of said valve element and a second support section which extends in a second direction from said first portion, said first and second support sections being plastically deformable to move said first portion of said valve element away from said base upon operation of said vent valve means from the closed condition to the open condition.

5. An apparatus for use in restraining movement of an occupant of a vehicle, said apparatus comprising:

a support structure having a planar panel section;

an air bag inflatable to an expanded condition adjacent to the occupant of the vehicle; and vent valve means for venting fluid from said air bag and for connecting said air bag to said panel section;

said panel section including surface means for defining an opening extending through said panel section, said air bag including surface means for defining an opening in said air bag, said opening in said air bag being aligned with said opening in said panel section, said vent valve means including a base which is fixedly connected with said panel section and having surface means for defining an opening which is aligned with said opening in said air bag and said opening in said panel section, said vent valve means including a valve element having a first portion which is movable relative to said base and said panel section between a closed condition in which said valve element blocks fluid flow from said air bag and an open condition in which said valve element enables fluid to flow from said air bag through said aligned openings in said air bag, said panel section and said base, said valve element having a second portion for retaining said first portion in the closed condition, said second portion having a leg section extending parallel to said panel section which remains engaged with said panel section when said first portion of said valve element is in its closed and open conditions.

6. An apparatus as set forth in claim 5 wherein said base is rigid and said valve element is formed of a material which is plastically deformable by fluid pressure to move said valve element from the closed condition to the open condition.

7. An apparatus as set forth in claim 5, wherein said second portion of said valve element includes retainer means for retaining said second portion of said valve element in engagement with said panel section.

8. An apparatus as set forth in claim 7, wherein said retainer means includes a tab projection engaging said panel section.

9. An apparatus as set forth in claim 5 wherein said base extends through said aligned openings in said air bag and said panel section.

10. An apparatus as set forth in claim 5 wherein said air bag is clamped against said support structure by said base.

11. An apparatus as set forth in claim 5 wherein said base includes an irregular surface area which is aligned with an irregular surface area on said support structure, said air bag being clamped between said irregular surface area on said base and said irregular surface area on said support structure.

12. An apparatus as set forth in claim 5 wherein said first portion of valve element is disposed in engagement with said base when said valve element is in the closed condition.

13. An apparatus as set forth in claim 5, wherein said panel section is a portion of a vehicle door inner panel, said vent means venting fluid to an interior of said vehicle door between said inner panel and an outer panel.

14. An apparatus for use in restraining movement of an occupant of a vehicle, said apparatus comprising:

a support structure;

an air bag inflatable to an expanded condition adjacent to the occupant of the vehicle; and vent valve means for venting fluid from said air bag and for connecting said air bag to said support structure;

said support structure including surface means for defining an opening extending through said support structure, said air bag including surface means for defining an opening in said air bag, said opening in said air bag being aligned with said opening in said support structure, said vent valve means including a base which is fixedly connected with said support structure and having surface means for defining an opening which is aligned with said opening in said air bag and said opening in said support structure, said vent valve means including a valve element which is movable relative to said base and said support structure between a closed condition in which said valve element blocks fluid flow from said air bag and an open condition in which said valve element enables fluid to flow from said air bag through said aligned openings in said air bag, said support structure and said base, said air bag being disposed adjacent to a first side surface of said support structure and said valve element being disposed adjacent to a second side surface of said support structure opposite from said first side surface of said support structure.

15. An apparatus for use in restraining movement of an occupant of a vehicle, said apparatus comprising:

a support structure;

an air bag inflatable to an expanded condition adjacent to the occupant of the vehicle; and vent valve means for venting fluid from said air bag and for connecting said air bag to said support structure;

said support structure including surface means for defining an opening extending through said support structure, said air bag including surface means: for defining an opening in said air bag, said opening in said air bag being aligned with said opening in said support structure, said vent valve means including a base which is fixedly connected with said support structure and having surface means for defining an opening which is aligned with said opening in said air bag and said opening in said support structure, said vent valve means including a valve element which is movable relative to said base and said support structure between a closed condition in which said valve element blocks fluid flow from said air bag and an open condition in which said valve element enables fluid to flow from said air bag through said aligned openings in said air bag, said support structure and said base, said support structure including a door panel, said opening in said support structure extending through said door panel, said apparatus further including a source of inflation fluid connected with said door panel at a location spaced from said vent valve means, said air bag and source of inflation fluid being disposed adjacent to a first side of said door panel, said vent valve being disposed adjacent to a second side of said door panel opposite from said first side of said door panel.

16. An apparatus for use in restraining movement of an occupant of a vehicle, said apparatus comprising:

an air bag inflatable from a deflated condition to an expanded condition extending adjacent to the occupant of the vehicle; and vent valve means connected in fluid communication with said air bag for venting fluid from said air bag, said vent valve means being operable between a closed condition and an open condition enabling fluid to flow from the air bag through said vent valve means;

said vent valve means including a valve element and a base having surface means for defining an opening through which fluid flows from said air bag when said vent valve means is in the open condition, said valve element having a first portion which blocks fluid flow through the opening in said base when said vent valve means is in the closed condition and a second portion which retains said first portion of said valve element in said first position relative to said base when said vent valve means is in the closed condition, said second portion of said valve element being plastically deformable from a first configuration to a second configuration upon movement of said first portion of said valve element under the influence of fluid pressure in said air bag from said first position to a second position relative to said base and operation of said vent valve means from the closed condition to the open condition, said second portion of said valve element remaining in the second configuration and supporting said first portion of said valve element in said second position relative to said base after fluid pressure in the air bag has been reduced to a fluid pressure which is insufficient to deform said second portion of said valve element plastically from the first configuration to the second configuration;

said second portion of said valve element including an arcuate bend section, a first leg section extending away from said arcuate bend section and connected with said base, and a second leg section extending away from said arcuate bend section and connected with said first portion of said valve element, said first and second leg sections decreasing in length and said arcuate bend section increasing in length as said valve element is plastically deformed and said vent valve means is operated from the closed condition to the open condition.

17. An apparatus comprising:

a vehicle having a door which at least partially defines a passenger compartment, said door including surface means for defining a cavity within said door;

an air bag inflatable to an expanded condition in the passenger compartment; and means for venting fluid from said air bag to the cavity within the door during inflation;

said means for venting fluid from said air bag including vent valve means for venting fluid from said air bag and for connecting said air bag to the door of said vehicle;

said vent valve means being operable between a closed condition and an open condition enabling fluid to flow from said air bag to the cavity within the door of said vehicle through said vent valve means, said vent valve means including a valve element and a base having surface means for defining an opening through which fluid flows from said air bag into the cavity in the door of said vehicle when said vent valve means is in the open condition, said valve element being at least partially disposed in the cavity in the door of said vehicle and having a first portion which blocks fluid flow through the opening in said base when said vent valve means is in the closed condition and a second portion which retains said first portion of said valve element in said first position relative to said base when said vent valve means is in the closed condition, said second portion of said valve element being plastically deformable from a first configuration to a second configuration upon movement of said first portion of said valve element under the influence of fluid pressure in said air bag from said first position to a second position relative to said base and operation of said vent valve means from the closed condition to the open condition, said second portion of said valve element remaining in the second configuration and supporting said first portion of said valve element in the cavity in the door of said vehicle after fluid pressure in the air bag has been reduced to a fluid pressure which is insufficient to deform said second portion of said valve element plastically from the first configuration to the second configuration.

18. An apparatus for use in restraining movement of an occupant of a vehicle, said apparatus comprising:

a vehicle door having a door panel section;

an air bag mounted on said door panel section, said air bag being inflatable from a deflated condition to an expanded condition in which said air bag is disposed between the occupant of the vehicle and said panel section; and vent valve means mounted on said panel section for venting fluid from the air bag during inflation of the air bag, said vent valve means including a valve element which has a leg section which engages said panel section and which is parallel to said panel section before and after venting;

said vent valve means including a base which is fixedly connected with said panel section, said base including surface means for defining a vent opening, said valve element being movable relative to said base and said panel section between a closed condition blocking fluid flow through the vent opening in said base and an open condition enabling fluid to flow through the vent opening in said base.

19. An apparatus for use in restraining movement of an occupant of a vehicle, said apparatus comprising:

a vehicle door having a door panel section;

an air bag mounted on said door panel section, said air bag being inflatable from a deflated condition to an expanded condition in which said air bag is disposed between the occupant of the vehicle and said panel section; and vent valve means mounted on said panel section for venting fluid from the air bag during inflation of the air bag, said vent valve means including a valve element which has a leg section which engages said panel section and which is parallel to said panel section before and after venting;

said door of the vehicle having inner and outer door panels, said panel section being a portion of the inner door panel which has an opening formed therein, said vent valve means including a base which is fixedly connected with said panel section and extends through the opening in the inner door panel, said base having surface means which defines an opening extending through said base, said valve element being disposed adjacent to a side of the door panel opposite from said air bag and movable relative to said base between a closed condition blocking fluid flow through the opening in said base and an open condition enabling fluid to flow through the opening in said base.

20. An apparatus for use in restraining movement of an occupant of a vehicle, said apparatus comprising:

a vehicle door having a door panel section;

an air bag mounted on said door panel section, said air bag being inflatable from a deflated condition to an expanded condition in which said air bag is disposed between the occupant of the vehicle and said panel section; and vent valve means mounted on said panel section for venting fluid from the air bag during inflation of the air bag, said vent valve means including a valve element which has a leg section which engages said panel section and which is parallel to said panel section before and after venting;

said door of the vehicle having inner and outer door panels, said panel section being a portion of the inner door panel which has an opening therein, said vent valve means including means for clamping a portion of the air bag against the inner door panel adjacent to the opening in the inner door panel, said valve element being movable relative to the inner door panel between a closed condition blocking fluid flow through the opening in the inner door panel and an open condition enabling fluid to flow through the opening in the inner door panel.

21. An apparatus for use in restraining movement of an occupant of a vehicle, said apparatus comprising:

a vehicle door having a door panel section;

an air bag mounted on said door panel section, said air bag being inflatable from a deflated condition to an expanded condition in which said air bag is disposed between the occupant of the vehicle and said panel section; and vent valve means mounted on said panel section for venting fluid from the air bag during inflation of the air bag, said vent valve means including a valve element which has a leg section which engages said panel section and which is parallel to said panel section before and after venting;

said door of the vehicle having inner and outer door panels, said panel section being a portion of the inner door panel which has an opening therein, said valve element being connected with the inner door panel,, said valve element being plastically deformable from a first configuration in which said valve element blocks fluid flow through the opening in the inner door panel to a second configuration in which said valve element is ineffective to block fluid flow through the opening in the inner door panel, said valve element being plastically deformable from the first configuration to the second configuration under the influence of fluid pressure in said air bag, said valve element remaining in said second configuration after fluid pressure in said air bag has been reduced to a fluid pressure which is insufficient to deform plastically said valve element.

* * * * *